March 3, 1959     R. W. FORD     2,876,023
FLUID CONDUIT SYSTEM WITH SEGMENTED HOUSING FOR
CLAMPING PARALLEL HOSES TO SUPPLY
AND DISCHARGE TUBES Filed July 13, 1955     2 Sheets-Sheet 1

INVENTOR.
RICHARD W. FORD
BY Woodling & Krost
ATTORNEYS

March 3, 1959  R. W. FORD  2,876,023
FLUID CONDUIT SYSTEM WITH SEGMENTED HOUSING FOR
CLAMPING PARALLEL HOSES TO SUPPLY
AND DISCHARGE TUBES Filed July 13, 1955  2 Sheets-Sheet 2

INVENTOR.
RICHARD W. FORD
BY Woodling & Krost
ATTORNEYS

United States Patent Office 2,876,023
Patented Mar. 3, 1959

2,876,023

FLUID CONDUIT SYSTEM WITH SEGMENTED HOUSING FOR CLAMPING PARALLEL HOSES TO SUPPLY AND DISCHARGE TUBES

Richard W. Ford, Findlay, Ohio, assignor to Central Rubber and Steel Corporation, Findlay, Ohio, a corporation of Ohio Application July 13, 1955, Serial No. 521,659

3 Claims. (Cl. 285—137)

The invention relates in general to means for maintaining the component parts of a fluid conduit system in fixed relationship to each other and more particularly to a housing comprising first and second mating sections which are securable about a fluid supply elbow member, a fluid discharge elbow member, and a fluid conduit means for holding these components in fixed relationship.

An object of the invention is to provide means for securing the component parts of a fluid conduit system together so that the parts remain securely connected together.

Another object of the invention is to provide a two-way fluid conducting system which is attachable to the customary domestic or commercial water supply such as the faucet in the sink of the ordinary home for supplying water to a household appliance or the like and which fluid conducting system is adapted to conduct the water from the household appliance or the like and discharge the water at a point where the customary domestic or commercial water supply such as the faucet in the ordinary sink would discharge the water.

Another object of the invention is to provide a mechanism for securing a fluid supply elbow member, a fluid discharge elbow member and a flexible conduit means which make up a fluid conduit system, together whereby the parts of the fluid conduit system are held in substantially fixed relationship to each other and will not become separated because of fluid pressure or physical misuse or a combination of both.

Another object of the invention is to provide a mechanism for securely maintaining the component parts of a fluid conduit system in fixed relationship with respect to each other which mechanism also serves as a handle or gripping means for urging the fluid conduit system into fluid conducting relationship with a fluid source.

Another object of the invention is to provide a fluid conducting system which may be quickly and readily assembled and disassembled into its component parts for quick cleaning and storage or for quick replacement of a damaged component.

Another object of the invention is to provide a mechanism for securing the parts of a fluid conducting system together which is highly decorative in appearance and which is readily assembled and easily manufactured.

Other objects and a fuller understanding of this invention may be had by referring to the following description and claims, taken in conjunction with the accompanying drawings, in which:

Figure 4:
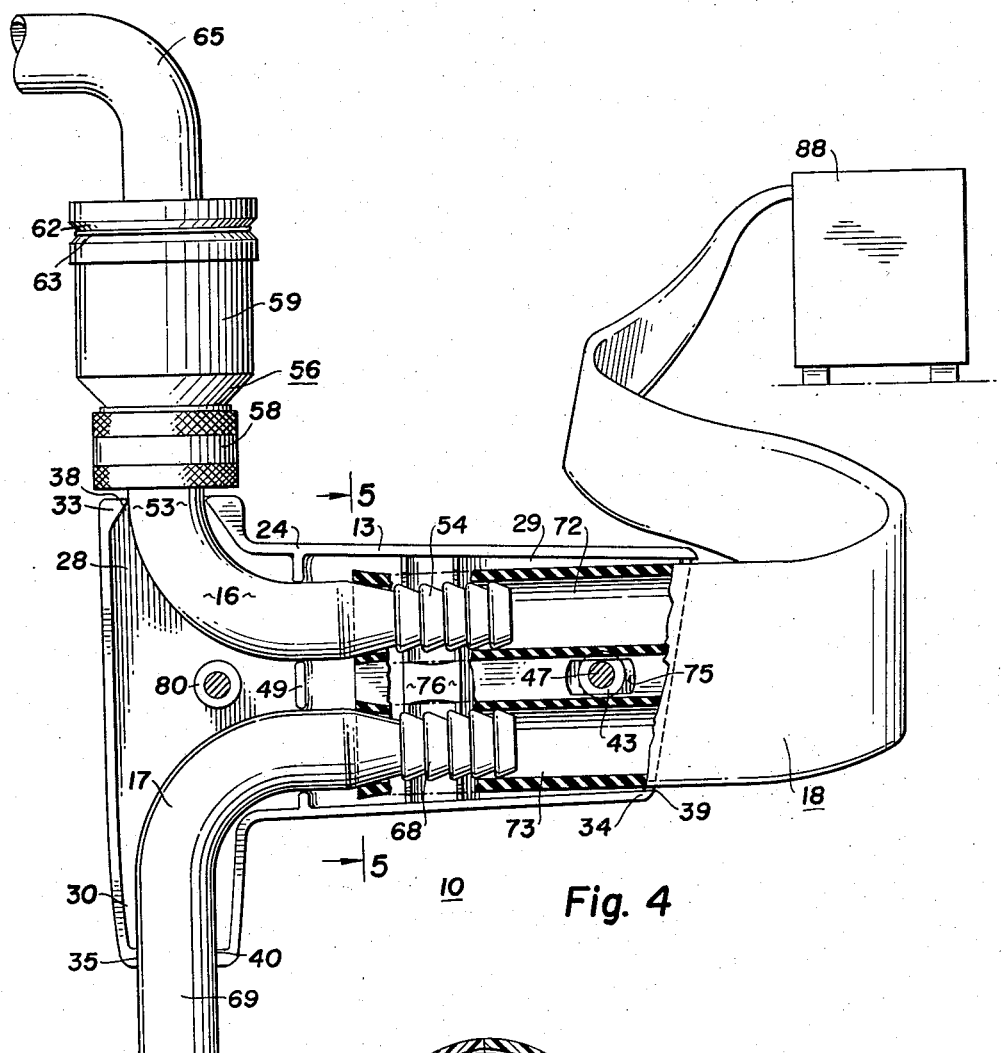
Figure 5:
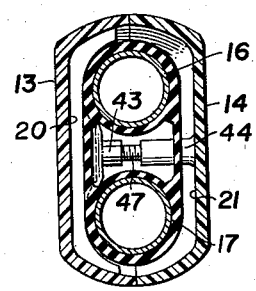

Figure 4 is a side elevation view partially in section of the components of the fluid conduit system in assembled relationship and showing the fluid conduit system in communication with a source of fluid supply and also communicating with a household appliance within which the fluid supply is to be used and subsequently discharged therefrom; and Figure 5 is a view taken generally along the lines 5—5 of Figure 4.

Figure 1:
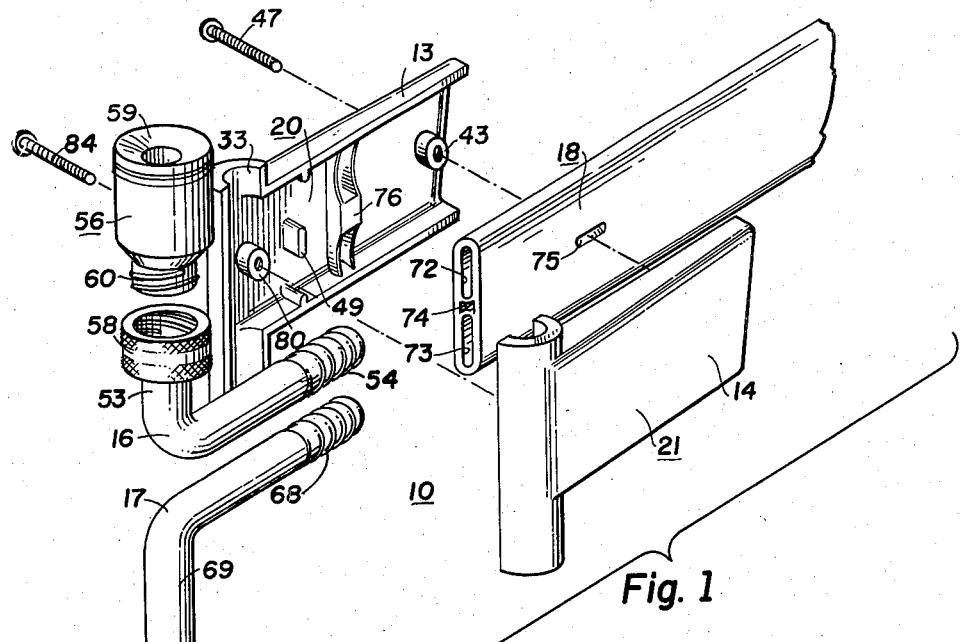
Figure 1 is an isometric exploded view of the component parts of the fluid conduit system.
Figure 2:
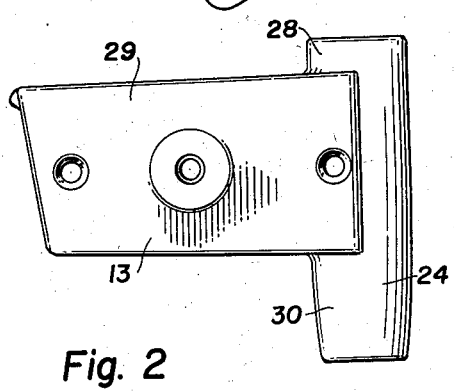
Figure 2 is a side elevation view of one of the mating sections shown in Figure 1 showing the opposite side of the mating section from that which is shown in Figure 1.
Figure 3:
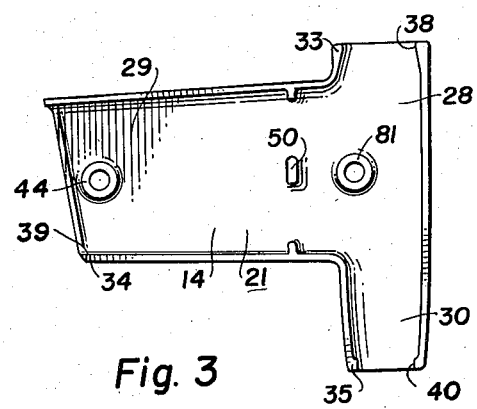
Figure 3 is a side elevation view of the other of the mating sections shown in Figure 1 generally illustrating the side which is not shown in Figure 1.

Figure 1 illustrates generally the component parts of a fluid conduit system indicated generally by the reference numeral 10. The component parts of the fluid conduit system 10 include first and second assemblable mating sections 13 and 14, a fluid supply elbow member 16, a fluid discharge elbow member 17 and fluid conduit means 18. The first and second mating sections 13 and 14 have first and second opposed side wall means 20 and 21. The first and second side wall means 20 and 21 of the assembled first and second mating sections 13 and 14 form generally a T-shaped housing 24 as best seen in Figure 4 of the accompanying drawings. The housing 24 has first, second and third legs 28, 29 and 30, respectively. The first, second and third legs 28, 29 and 30 terminate in first, second and third annular wall means 33, 34 and 35, respectively. The first, second and third annular wall means define respectively first, second and third openings 38, 39 and 40 in said T-shaped housing 24. The side wall means 20 of the first mating section 13 has an anchor support means 43 extending inwardly toward the side wall means 21 of the second mating section 14. The side wall means 21 of the second mating section 14 has anchor support means 44 extending inwardly toward the side wall means 20 of the first mating section 13. Anchor screw means 47 are extendable through the anchor support means 43 and threadably attachable within the anchor support means 44 for maintaining the first and second mating sections 13 and 14 in fixed assembled relationship with respect to each other. The side wall means 20 and 21 have first and second divider means 49 and 50, respectively, which divider means extend inwardly toward each other from their respective side walls.

The fluid supply elbow member 16 has a connection portion 53 and an insert portion 54. The connection portion 53 of the fluid supply elbow member extends through the first opening 38 as best shown in Figure 4 with the first annular wall means 33 snugly extending therearound for supporting the fluid supply elbow member 16 within the T-shaped housing 24. The insert portion 54 of the fluid supply elbow member 16 extends and lies within the second leg 29 of the T-shaped housing 24. Attachment means 56 are provided and which cooperate with the connection portion 53 of the fluid supply elbow member for attaching the fluid supply elbow member to a source of fluid supply. The attachment means include a female connection element 58 attached to the connection portion 53 of the fluid supply elbow member 16, and a rubber-like faucet attachment member 59. The rubber-like faucet attachment member is provided with male threads 60 thereon whereby the rubber-like faucet attachment member 59 may be screwed into the female connection element 58. The faucet attachment member 59 is provided with an annular groove around the top portion thereof and a metallic securing member 63 which resides within this groove. In Figure 4, the source of fluid supply has been illustrated as a conventional water faucet 65 which might be found in any home and is shown in this figure only partially.

The fluid discharge elbow member 17 has an insert portion 68 and a discharge portion 69. The discharge portion 69 of the fluid discharge elbow member extends through the third opening 40 with the third annular wall means 35 extending snugly therearound for supporting the fluid discharge elbow member 17 extends and lies within the second leg portion 29 of the T-shaped housing 24 substantially parallel with the insert portion 54 of the fluid supply elbow member 16. In the assembled position, the divider means 49 and 50 reside between the fluid supply elbow member 16 and the fluid discharge elbow member 17 for dividing the members 16 and 17 from each other. The divider means in combination with the side wall means also serve as a channel or guideway in which to receive the members 16 and 17.

The fluid conduit means 18 comprises a rubber-like supply conduit 72 and a rubber-like fluid discharge conduit 73 and a rubber-like web 74 extending therebetween which makes in this particular embodiment of the fluid conduit means an integral unit. The fluid conduit means 18 extends into the second leg portion 29 of the T-shaped housing 24 through the second opening 39 with the second annular wall means 34 extending snugly therearound for supporting the fluid conduit means 18 in fixed relationship to the other component parts of the fluid conduit system. The forward portion of the fluid conduit means 18 rests on a cradle member 76 which extends from the side wall means 20. The insert portion 54 of the fluid supply elbow member 16 and the insert portion 68 of the fluid discharge elbow member 17 are connected respectively to the rubber-like supply conduit 72 and the rubber-like fluid discharge conduit 73. This is usually done by merely pushing the ends of the supply conduit and the discharge conduit over the insert portions of the fluid supply and discharge elbow member 16 and 17. The resiliency of the rubber-like material and the knurled effect on the insert portion of the members 16 and 17 effect a comparatively secure fluid conducting relationship between these components. The fluid conduit means 18 has an aperture 75 extending laterally through the rubber-like web 74. The anchor screw means 47 extend through the aperture 75 in the web 74 to assist in holding the conduit means 18 in the T-shaped housing 24. The anchor screw means 47 also draws the first and second mating sections 13 and 14 toward each other to maintain the second annular wall means 34 into snugly surrounding engagement with the fluid conduit means 18. The side wall means 20 and 21 of the T-shaped housing 24 are provided with retaining support means 80 and 81, respectively, which extend inwardly toward each other. Retaining screw means 84 are extendable through the retaining support means 80 of the mating section 13 and into the retaining support means 81 of the mating section 14 to assist in maintaining the first and second mating sections in fixed assembled relationship with respect to each other. The retaining support means 80 and 81 and the retaining screw means 84 are located adjacent the fluid supply elbow member 16 and the fluid discharge member 17 for directing the mating sections 13 and 14 toward each other with the first and third annular wall means 33 and 35 snugly surrounding respectively the connection portion 53 of the fluid supply elbow member 16 and the discharge portion 69 of the fluid discharge elbow member 17.

In Figure 4, the supply conduit means have been shown as communicating with a household appliance 88 which household appliance may include washing machines, dish washers and other similar appliances, which in the drawing is shown perspectively small. After the fluid conduit system has been assembled, as shown in Figure 4, it will be readily seen that fluid may be introduced through the faucet 65 which fluid would continue through the fluid supply member and into the supply conduit 72 and hence on into the appliance 88. The appliance 88 would, of course, be adapted to use the fluid which is so introduced, such as by the washing of clothes or dishes; and after the fluid has once been utilized, it would be pumped from the appliance by any suitable pump not shown in the accompanying drawings out through the discharge conduit 73 through the fluid discharge elbow member 17 and into any suitable drain or sump mechanism.

It will thus be seen that suitable means have been provided for securing the component parts of the fluid conduit system together, namely the fluid supply and discharge elbow members 16 and 17 and the fluid conduit means 18 whereby these parts of the fluid conduit system are held in substantially fixed relationship to each other and will not become separated because of fluid pressure or physical misuse or a combination of both. It would be very apparent, of course, that if the mating sections 13 and 14 which make up the T-shaped housing were not provided that fluid pressure or handling would be quite likely to cause disconnection of the components of this system, if not merely a directing of the fluid discharge member in the wrong direction. If the fluid discharge elbow member were allowed to become twisted in any manner, a housewife might find that the used fluid from the appliance 88 has been discharged all over her kitchen or laundry room floor. In addition to securely maintaining the component parts of the fluid conduit system in fixed relationship with respect to each other, this mechanism also serves as a handle or gripping means for urging the attachment means 56 into fluid conducting relationship with the water faucet 65. It can be seen by viewing the accompanying drawings that any amount of pushing or twisting, which is required to connect the water faucet and the fluid conduit system together, will not disrupt the interconnection of the components of this system.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a two-way fluid conduit system including a first and a second assemblable mating section, said first and second mating sections having first and second opposed side wall means, said first and said second side wall means of the assembled first and second mating sections forming a housing having first, second and third legs, said first, second and third legs terminating in first, second and third annular wall means which annular wall means define respectively first, second and third openings in said housing, each said side wall means having anchor support means extending inwardly toward each other, anchor screw means extending through said anchor support means of one of said mating sections and into said anchor support means of the other of said mating sections for maintaining said first and second mating sections in fixed assembled relationship with respect to each other, a fluid supply elbow member having a connection portion and an insert portion, said connection portion of said fluid supply elbow member extending through said first opening with said first annular wall means snugly extending therearound for supporting said fluid supply elbow member in said housing, said insert portion of said fluid supply elbow member lying within said second leg of said housing, a fluid discharge elbow member having an insert portion and a discharge portion, said discharge portion of said fluid discharge elbow member extending through said third opening with said third annular wall means extending therearound for supporting said fluid discharge elbow member in said housing, said insert portion of said fluid discharge elbow member lying within said second leg portion of said housing, fluid conduit means comprising a rubber-like fluid supply conduit and a rubber-like fluid discharge conduit, said fluid conduit means extending into said second leg portion of said housing through said second opening with said second annular wall means extending therearound for supporting said fluid conduit means, said insert portion of said fluid supply elbow member and said insert portion of said fluid discharge elbow member connected respectively to said rubber-like fluid supply conduit and said rubber-like fluid discharge conduit, a cradle member extending from one of said first and second side wall means, a portion of said fluid conduit means containing said insert portions of said fluid supply and discharge members resting in said cradle member to aid in securing said fluid conduit means, said anchor screw means extending through the rubber-like fluid and discharge conduits to aid in securing the same within the mating sections, said anchor screw means drawing said mating sections toward each other with the second annular wall means snugly surrounding the fluid conduit means, each said side wall means of said housing having retaining support means extending inwardly toward each other, retaining screw means extending through said retaining support means of one of said mating sections and into said retaining support means of the other of said mating sections to assist in maintaining said first and second mating sections in fixed assembled relationship with respect to each other, said retaining support means and said retaining screw means located adjacent said fluid supply elbow member and fluid discharge member for drawing said mating sections toward each other with the first and third annular wall means snugly surrounding respectively the connection portion of the fluid supply elbow member and the discharge portion of the fluid discharge elbow member.

2. In a two-way fluid conduit system including a first and second assemblable mating section, said first and second mating sections having first and second opposed side wall means, said first and said second side wall means of the assembled first and second mating sections forming a T-shaped housing having first, second and third legs, said first, second and third legs terminating in first, second and third annular wall means which annular wall means define respectively first, second and third openings in said T-shaped housing, each said side wall means having anchor support means extending inwardly toward each other, anchor screw means extending through said anchor support means of one of said mating sections and into said anchor support means of the other of said mating sections for maintaining said first and second mating sections in fixed assembled relationship with respect to each other, each said side wall means having divider means extending inwardly toward each other, a fluid supply elbow member having a connection portion and an insert portion, said connection portion of said fluid supply elbow member extending through said first opening with said first annular wall means snugly extending therearound for supporting said fluid supply elbow member in said T-shaped housing, said insert portion of said fluid supply elbow member lying within said second leg of said T-shaped housing, attachment means cooperating with said connection portion of said fluid supply elbow member for attaching said fluid supply elbow member to a source of fluid supply, a fluid discharge elbow member having an insert portion and a discharge portion, said discharge portion of said fluid discharge elbow member extending through said third opening with said third annular wall means extending therearound for supporting said fluid discharge elbow member in said T-shaped housing, said insert portion of said fluid discharge elbow member lying within said second leg portion of said T-shaped housing substantially parallel with said insert portion of said fluid supply elbow member, said divider means residing between said fluid supply elbow member and said fluid discharge elbow member for dividing said members from each other, fluid conduit means comprising a rubber-like fluid supply conduit and a rubber-like fluid discharge conduit having a rubber-like web extending therebetween, said fluid conduit means extending into said second leg portion of said T-shaped housing through said second opening with said second annular wall means extending therearound for supporting said fluid conduit means, said insert portion of said fluid supply elbow member and said insert portion of said fluid discharge elbow member connected respectively to said rubber-like fluid supply conduit and said rubber-like fluid discharge conduit, said fluid conduit means having an aperture extending laterally through said rubber-like web, said anchor screw means extending through said aperture in said web of said fluid conduit means to assist in holding said conduit means in said T-shaped housing and drawing said mating sections toward each other with the second annular wall means snugly surrounding the fluid conduit means, each said side wall means of said T-shaped housing having retaining support means extending inwardly toward each other, retaining screw means extending through said retaining support means of one of said mating sections and into said retaining support means of the other of said mating sections to assist in maintaining said first and second mating sections in fixed assembled relationship with respect to each other, said retaining support means and said retaining screw means located adjacent said fluid supply elbow member and fluid discharge member for drawing said mating sections toward each other with the first and third annular wall means snugly surrounding respectively the connection portion of the fluid supply elbow member and the discharge portion of the fluid discharge elbow member.

3. A fluid conduit system including in combination a housing comprising first and second mating sections, said housing having wall means defining first, second and third openings therein, said first and third openings being disposed substantially ninety degrees with respect to said second opening, a curved separate fluid supply elbow member having first and second end portions disposed substantially ninety degrees apart, said first end portion of said fluid supply elbow residing in said housing and said second extending toward said second opening and said end portion thereof extending through said first opening, a curved separate fluid discharge elbow member having first and second end portions disposed substantially ninety degrees apart, said first end portion of said fluid discharge elbow residing in said housing adjacent said fluid supply elbow and extending toward said second opening and said second end portion thereof extending through said third opening, a unitary rubber-like member including combined supply and discharge conduits extending through said second opening to said first end portion of said separate supply and discharge elbows, said first end portion of said separate supply and discharge elbows respectively residing within said supply and discharge conduits of said unitary rubber-like member, dividing means extending between said mating sections between said first end portions of said separate supply and discharge elbows adjacent the end of said unitary rubber-like member, said dividing means and said wall means of said first and third openings cooperating with said curved supply and discharge elbows to aid in preventing removal of said elbows from said housing, means connecting said first and second mating sections in fixed relationship to each other whereby said wall means engage said supply and discharge conduits and said unitary rubber-like member to aid in maintaining same in fixed relationship with each other, and said means connecting said first and second mating sections also extending through said unitary rubber-like member to aid in maintaining the same in a fixed position within said housing.

References Cited in the file of this patent
UNITED STATES PATENTS

| | | |
|---|---|---|
| 995,674 | Hertzberg | June 20, 1911 |
| 1,170,167 | Kuhn | Feb. 1, 1916 |
| 1,834,793 | McArdle | Dec. 1, 1931 |
| 1,988,003 | Ford | Jan. 15, 1935 |
| 2,146,067 | Graham | Feb. 7, 1939 |
| 2,273,631 | Edwards | Feb. 17, 1942 |
| 2,358,367 | Van Meerbeke | Sept. 19, 1944 |
| 2,701,147 | Summerville | Feb. 1, 1955 |